US009094345B2

(12) United States Patent
DeCusatis et al.

(10) Patent No.: US 9,094,345 B2
(45) Date of Patent: Jul. 28, 2015

(54) RESERVATION SYSTEM FOR AN ETHERNET NETWORK

(75) Inventors: Casimer M. DeCusatis, Poughkeepsie, NY (US); Rajaram B. Krishnamurthy, Wappingers Falls, NY (US); Anuradha Rao, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 717 days.

(21) Appl. No.: 13/362,749

(22) Filed: Jan. 31, 2012

(65) Prior Publication Data

US 2013/0194925 A1    Aug. 1, 2013

(51) Int. Cl.
*H04L 12/911* (2013.01)
*H04L 12/927* (2013.01)

(52) U.S. Cl.
CPC .............. *H04L 47/72* (2013.01); *H04L 47/781* (2013.01); *H04L 47/805* (2013.01); *H04L 47/828* (2013.01)

(58) Field of Classification Search
None
See application file for complete search history.

(56) References Cited

U.S. PATENT DOCUMENTS

| 8,027,354 B1 * | 9/2011 | Portolani et al. ............... 370/431 |
| 2008/0192632 A1 * | 8/2008 | Bader ......................... 370/230.1 |
| 2011/0078299 A1 * | 3/2011 | Nagapudi et al. ............. 709/223 |

OTHER PUBLICATIONS

Kofler, Ingo et al., Improving IPTV Services by H.264/SVC Adaptation and Traffic Control, 2009 IEEE International Symposium on Broadband Multimedia Systems and Broadcasting, BMSB 2009.
Chen, W. T. , A Bandwidth Reservation Protocol for Hard QoS Guaranteed Differentiated Services, ICC 2001. IEEE International Conference on Communications. Conference Record (Cat. No. 01CH37240).

* cited by examiner

*Primary Examiner* — Christine Duong
(74) *Attorney, Agent, or Firm* — Steven Chiu; Ido Tuchman

(57) ABSTRACT

An improved computer system may include a server carrying a computer processor in a Fiber Channel over Convergence Enhanced Ethernet (FCoCEE) network. The system may also include a reservation system in communication with the server that utilizes enhanced transmission selection (ETS) to reserve bandwidth for a priority group by scheduling bandwidth for the priority group based upon a projected workload.

15 Claims, 9 Drawing Sheets

RESERVATION SYSTEM FOR AN ETHERNET NETWORK

BACKGROUND

The invention relates to the field of computers, and, more particularly, to computer networking.

Enhanced transmission selection (ETS) is one of the enhancements to Converged Enhanced Ethernet (CEE) that is intended to provide bandwidth allocation to priority groups. In its current form, ETS enables bandwidth sharing between priority groups carrying bursty high offered loads.

SUMMARY

According to one embodiment of the invention, an improved computer system may include a server carrying a computer processor in a Fibre Channel over Convergence Enhanced Ethernet (FCoCEE) network. The system may also include a reservation system in communication with the server that utilizes enhanced transmission selection (ETS) to reserve bandwidth for a priority group by scheduling bandwidth for the priority group based upon a projected workload.

The server may tag the priority group for which bandwidth is to be reserved with a virtual ID. The virtual ID may be recognized by ETS, which schedules known traffic delivery and notifies other servers in the FCoCEE network that bandwidth for the priority group having the virtual ID is reserved.

The server may rout the priority group through the FCoCEE network avoiding bottlenecks. The reservation system may use ETS to reserve a shared bandwidth for the priority group.

The projected workload may be based upon duration of the projected workload. The reservation system may use ETS to reserve a sustained bandwidth end to end for the priority group.

The reservation system may request a bandwidth schedule that preempts all flows in progress. The reservation system may notify senders of the flows in progress of reduced throughput.

Another aspect of the invention is a method for improving a computer system. The method may include utilizing enhanced transmission selection (ETS) through a reservation system on a server including a computer processor in a Fibre Channel over Convergence Enhanced Ethernet (FCoCEE) network. The method may also include reserving bandwidth for a priority group by scheduling bandwidth for the priority group based upon a projected workload.

The method may further include tagging the priority group at the server for which bandwidth is to be reserved with a virtual ID, and the virtual ID is recognized by ETS, which schedules known traffic delivery and notifies other servers in the FCoCEE network that bandwidth for the priority group having the virtual ID is reserved. The method may additionally include routing via the server the priority group through the FCoCEE network to avoid bottlenecks, and the reservation system uses ETS to reserve a shared bandwidth for the priority group.

The method may also include basing the projected workload upon duration of the projected workload, and using ETS to reserve a sustained bandwidth end to end for the priority group. The method may further include requesting through the reservation system a bandwidth schedule that preempts all flows in progress. The method may additionally include notifying senders of the flows in progress of reduced throughput by the reservation system.

Another aspect of the invention is computer readable program codes coupled to tangible media to improve a computer system. The computer readable program codes may be configured to cause the program to utilize enhanced transmission selection (ETS) through a reservation system in communication with a server including a computer processor in a Fibre Channel over Convergence Enhanced Ethernet (FCoCEE) network. The computer readable program codes may also reserve bandwidth for a priority group by scheduling bandwidth for the priority group based upon a projected workload.

The computer readable program codes may further tag the priority group at the server for which bandwidth is to be reserved with a virtual ID, and the virtual ID is recognized by ETS, which schedules known traffic delivery and notifies other servers in the FCoCEE network that bandwidth for the priority group having the virtual ID is reserved. The computer readable program codes may additionally rout via the server the priority group through the FCoCEE network to avoid bottlenecks, and the reservation system uses ETS to reserve a shared bandwidth for the priority group.

The computer readable program codes may also base the projected workload upon duration of the projected workload, and use the ETS to reserve a sustained bandwidth end to end for the priority group. The computer readable program codes may further request through the reservation system a bandwidth schedule that preempts all flows in progress. The computer readable program codes may additionally notify senders of the flows in progress of reduced throughput by the reservation system.

DETAILED DESCRIPTION

The invention will now be described more fully hereinafter with reference to the accompanying drawings, in which preferred embodiments of the invention are shown. Like numbers refer to like elements throughout, like numbers with letter suffixes are used to identify similar parts in a single embodiment, and letter suffix lower case n is a variable that indicates an unlimited number of similar elements.

Figure 1:
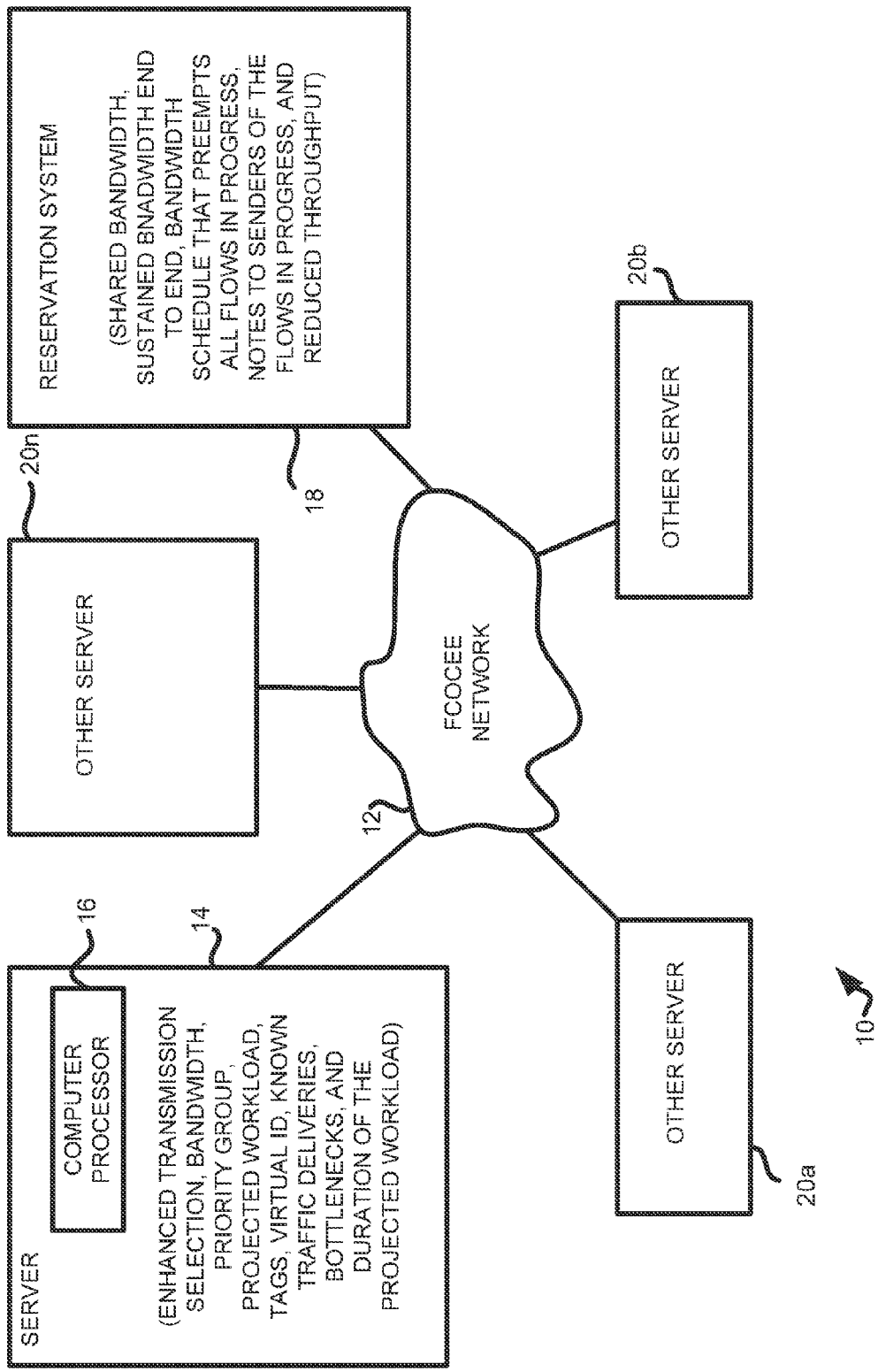
FIG. 1 is a block diagram illustrating an improved computer system for a Fibre Channel over Convergence Enhanced Ethernet (FCoCEE) network in accordance with the invention.

With reference now to FIG. 1, an improved computer system 10 for a Fibre Channel over Convergence Enhanced Ethernet (FCoCEE) network 12 is initially described. In an embodiment, the system 10 includes a server 14 comprising a computer processor 16 in the FCoCEE network 12. The system 10 also includes a reservation system 18 in communication with the server 14 that utilizes enhanced transmission selection (ETS) to reserve bandwidth for a priority group by scheduling bandwidth for the priority group based upon a projected workload.

In one embodiment, the server 14 tags the priority group for which bandwidth is to be reserved with a virtual ID. In another embodiment, the virtual ID is recognized by the ETS, which schedules known traffic delivery and notifies other servers 20 in the FCoCEE network 12 that bandwidth for the priority group having the virtual ID is reserved.

In one embodiment, the server 14 routs the priority group through the FCoCEE network 12 avoiding bottlenecks. In another embodiment, the reservation system 18 uses the ETS to reserve a shared bandwidth for the priority group.

In one embodiment, the projected workload is based upon duration of the projected workload. In another embodiment, the reservation system 18 uses the ETS to reserve a sustained bandwidth end to end for the priority group.

In one embodiment, the reservation system 18 requests a bandwidth schedule that preempts all flows in progress. In another embodiment, the reservation system 18 notifies senders of the flows in progress of reduced throughput.

Figure 2:
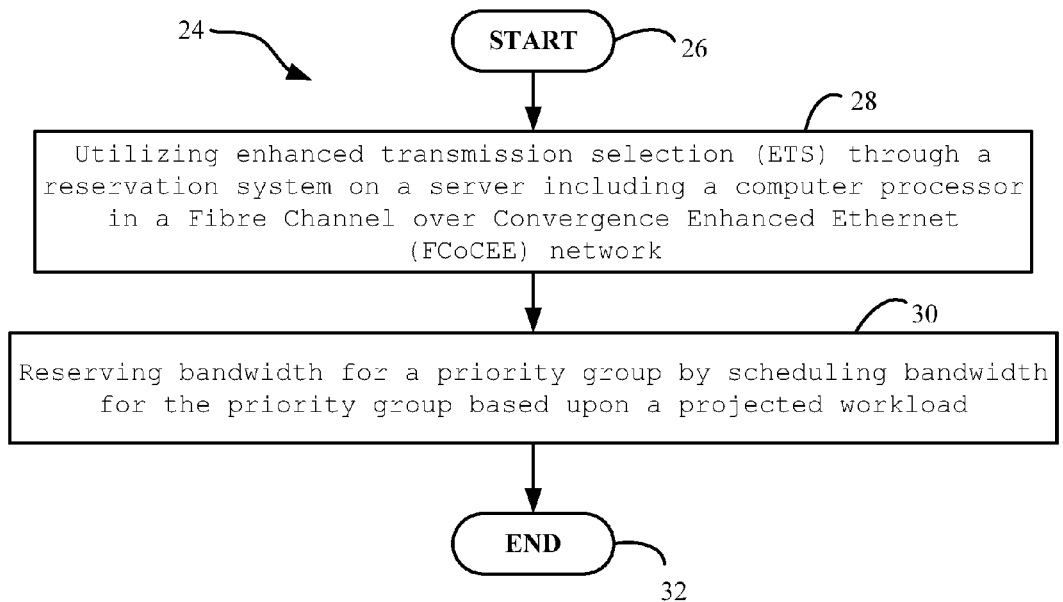
FIG. 2 is a flowchart illustrating method aspects of improved communications over a Convergence Enhanced Ethernet (FCoCEE) network according to the invention.

Another aspect of the invention is a method for improving a computer system, which is now described with reference to flowchart 24 of FIG. 2. The method begins at Block 26 and may include utilizing enhanced transmission selection (ETS) through a reservation system on a server including a computer processor in a Fibre Channel over Convergence Enhanced Ethernet (FCoCEE) network at Block 28. The method may also include reserving bandwidth for a priority group by scheduling bandwidth for the priority group based upon a projected workload at Block 30. The method ends at Block 32.

Figure 3:
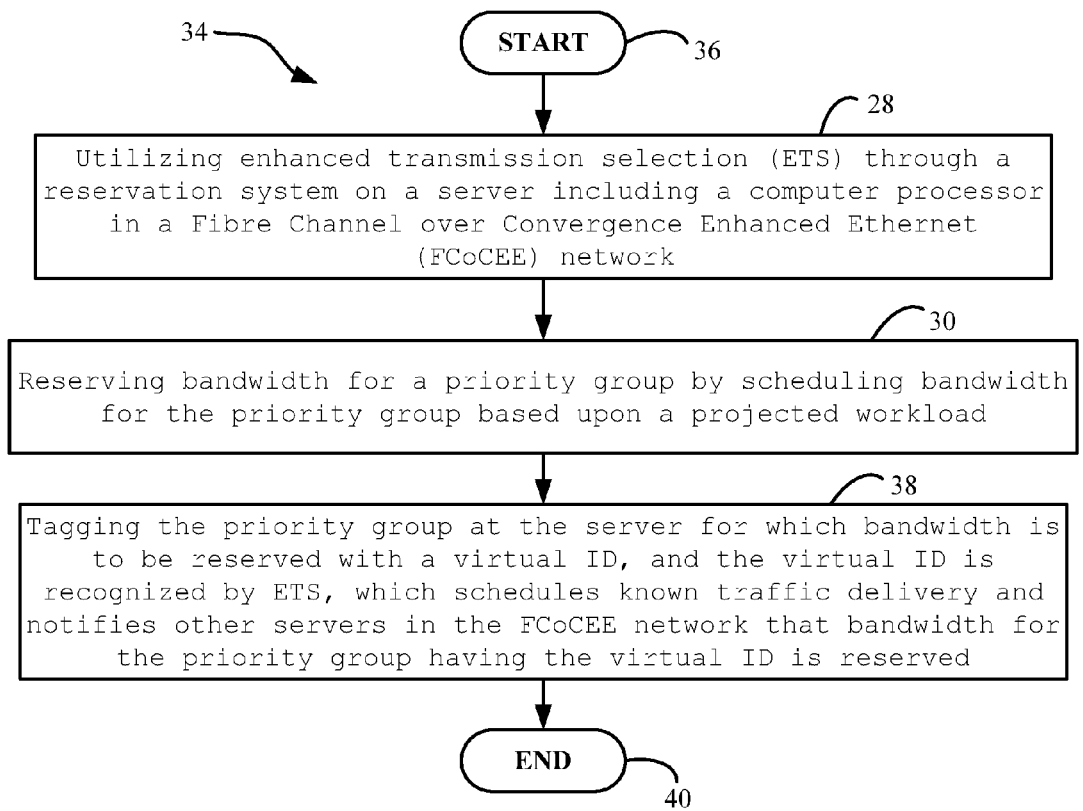
FIG. 3 is a flowchart illustrating method aspects of improved communications over a Convergence Enhanced Ethernet (FCoCEE) network according to the method of FIG. 2.

In another method embodiment, which is now described with reference to flowchart 34 of FIG. 3, the method begins at Block 36. The method may include the steps of FIG. 2 at Blocks 28 and 30. The method may further include tagging the priority group at the server for which bandwidth is to be reserved with a virtual ID, and the virtual ID is recognized by ETS, which schedules known traffic delivery and notifies other servers in the FCoCEE network that bandwidth for the priority group having the virtual ID is reserved at Block 38. The method ends at Block 40.

Figure 4:
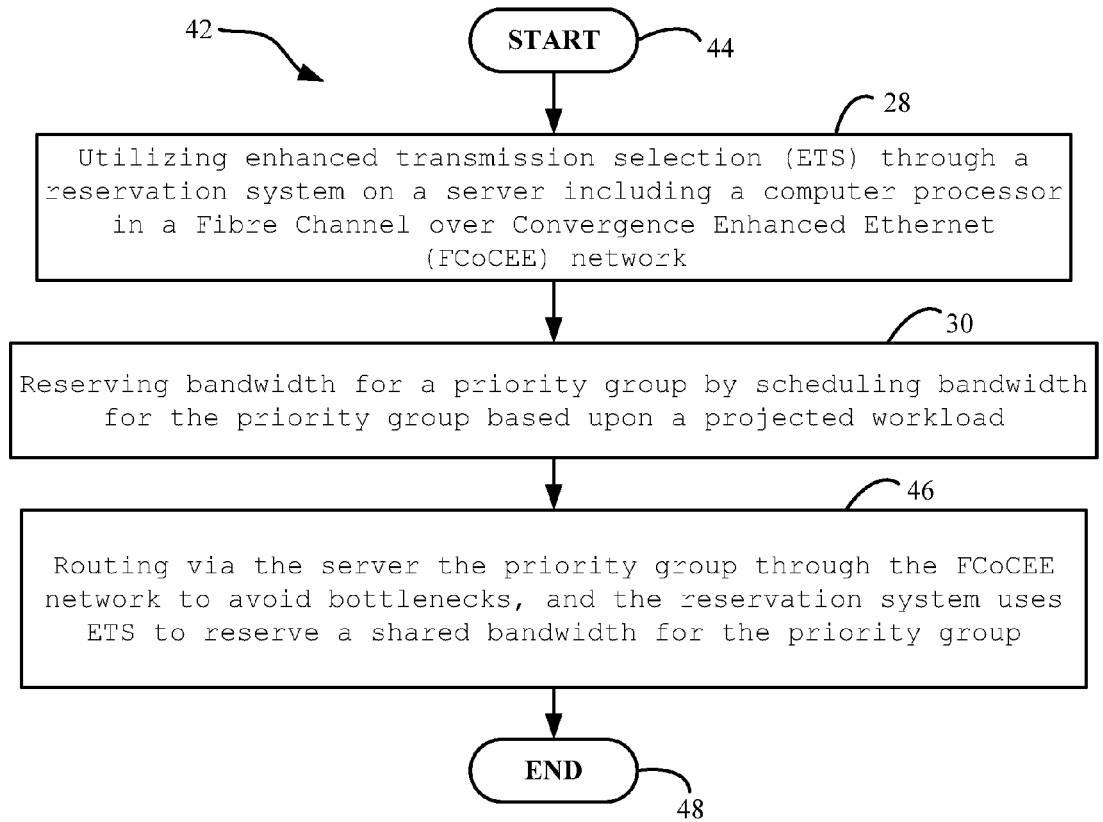
FIG. 4 is a flowchart illustrating method aspects of improved communications over a Convergence Enhanced Ethernet (FCoCEE) network according to the method of FIG. 2.

In another method embodiment, which is now described with reference to flowchart 42 of FIG. 4, the method begins at Block 44. The method may include the steps of FIG. 2 at Blocks 28 and 30. The method may additionally include routing via the server the priority group through the FCoCEE network to avoid bottlenecks, and the reservation system uses ETS to reserve a shared bandwidth for the priority group at Block 46. The method ends at Block 48.

Figure 5:
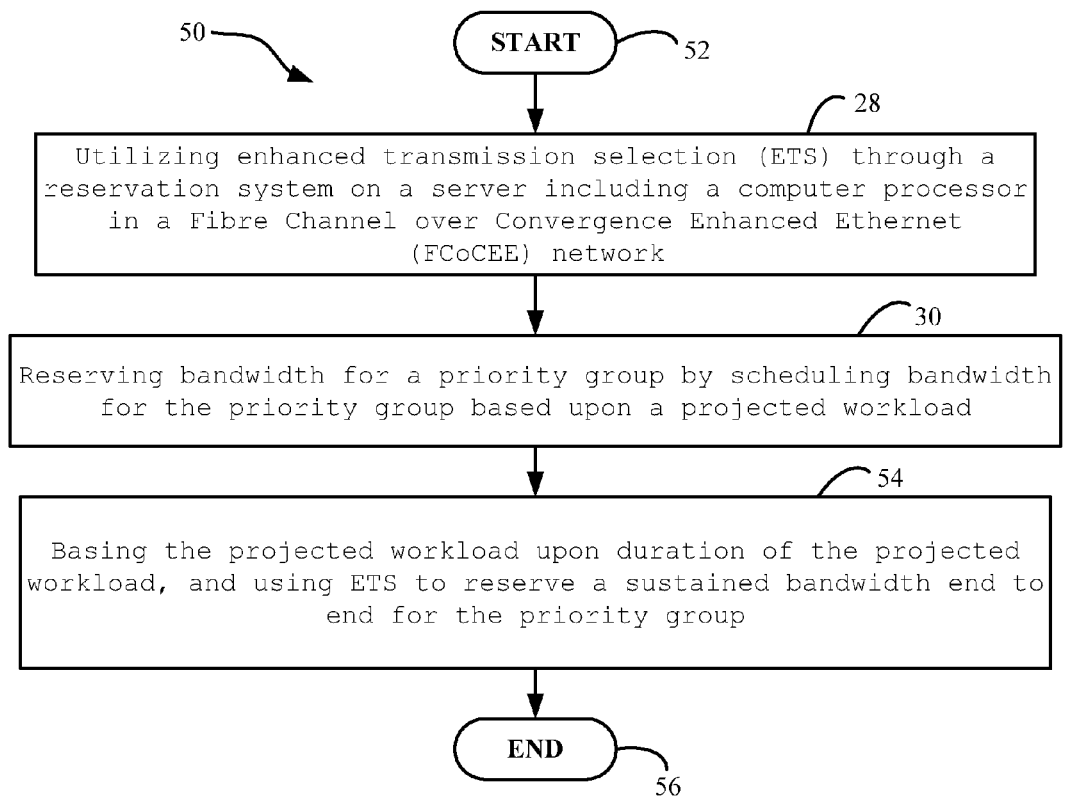
FIG. 5 is a flowchart illustrating method aspects of improved communications over a Convergence Enhanced Ethernet (FCoCEE) network according to the method of FIG. 2.

In another method embodiment, which is now described with reference to flowchart 50 of FIG. 5, the method begins at Block 52. The method may include the steps of FIG. 2 at Blocks 28 and 30. The method may also include basing the projected workload upon duration of the projected workload, and using ETS to reserve a sustained bandwidth end to end for the priority group at Block 54. The method ends at Block 56.

Figure 6:
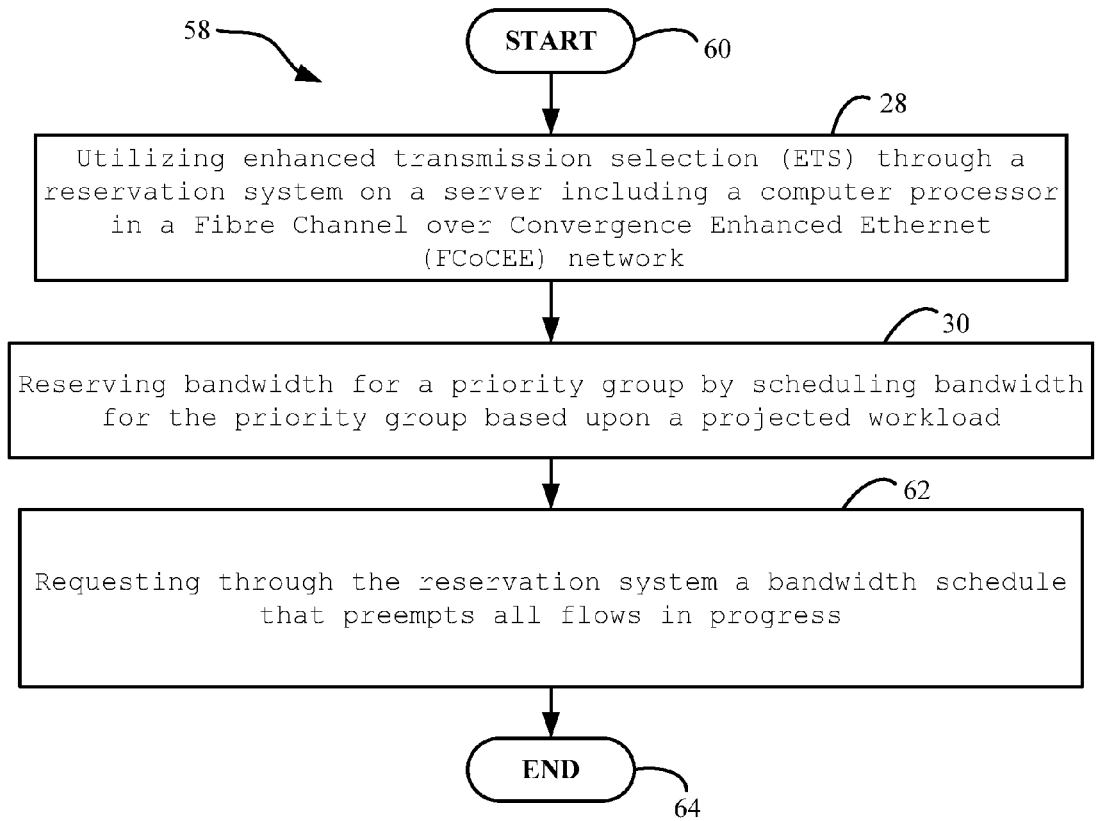
FIG. 6 is a flowchart illustrating method aspects of improved communications over a Convergence Enhanced Ethernet (FCoCEE) network according to the method of FIG. 2.

In another method embodiment, which is now described with reference to flowchart 58 of FIG. 6, the method begins at Block 60. The method may include the steps of FIG. 2 at Blocks 28 and 30. The method may further include requesting through the reservation system a bandwidth schedule that preempts all flows in progress at Block 62. The method ends at Block 64.

Figure 7:
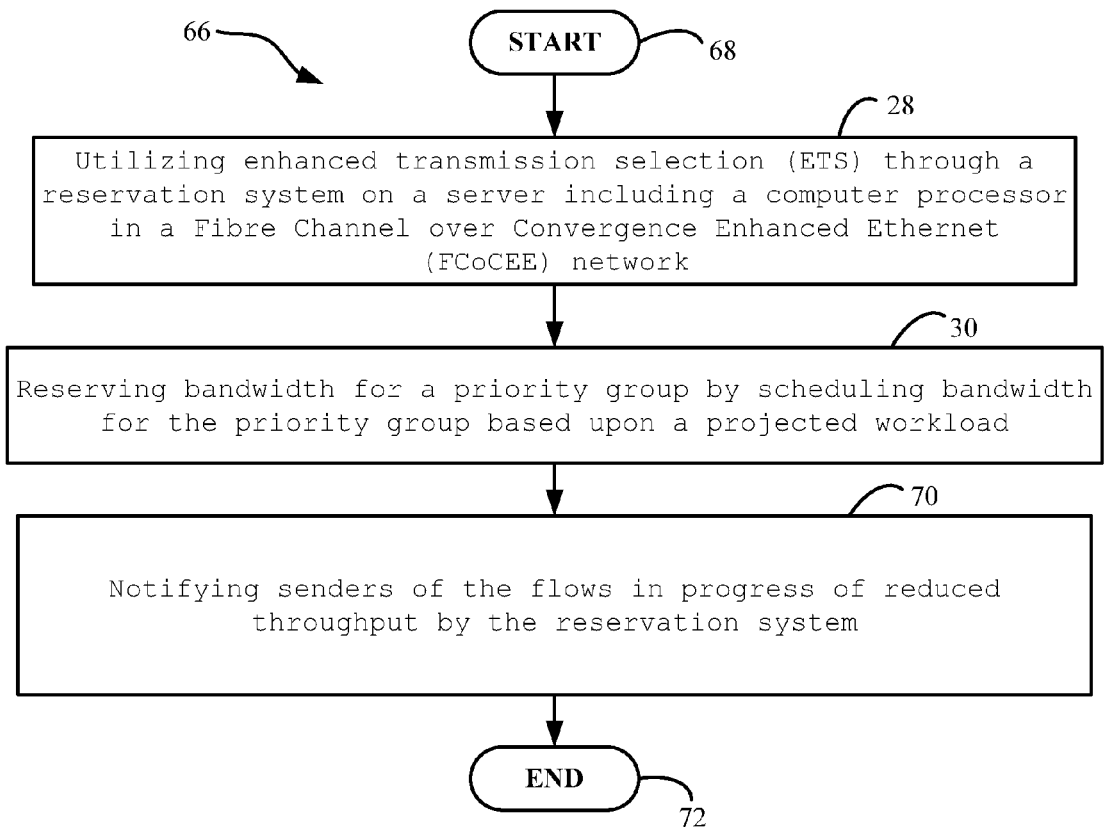
FIG. 7 is a flowchart illustrating method aspects of improved communications over a Convergence Enhanced Ethernet (FCoCEE) network according to the method of FIG. 2.

In another method embodiment, which is now described with reference to flowchart 66 of FIG. 7, the method begins at Block 68. The method may include the steps of FIG. 2 at Blocks 28 and 30. The method may additionally include notifying senders of the flows in progress of reduced throughput by the reservation system at Block 70. The method ends at Block 72.

Another aspect of the invention is computer readable program codes coupled to tangible media to improve a computer system 10. The computer readable program codes may be configured to cause the program to utilize enhanced transmission selection (ETS) through a reservation system 18 on a server 14 including a computer processor 16 in a Fibre Channel over Convergence Enhanced Ethernet (FCoCEE) network 12. The computer readable program codes may also reserve bandwidth for a priority group by scheduling bandwidth for the priority group based upon a projected workload.

The computer readable program codes may further tag the priority group at the server 14 for which bandwidth is to be reserved with a virtual ID, and the virtual ID is recognized by ETS, which schedules known traffic delivery and notifies other servers 20 in the FCoCEE network 12 that bandwidth for the priority group having the virtual ID is reserved. The computer readable program codes may additionally rout via the server 14 the priority group through the FCoCEE network 12 to avoid bottlenecks, and the reservation system 18 uses ETS to reserve a shared bandwidth for the priority group.

The computer readable program codes may also base the projected workload upon duration of the projected workload, and use the ETS to reserve a sustained bandwidth end to end for the priority group. The computer readable program codes may further request through the reservation system 18 a bandwidth schedule that preempts all flows in progress. The computer readable program codes may additionally notify senders of the flows in progress of reduced throughput by the reservation system 18.

In view of the foregoing, the system 10 improves the FCoCEE network 12. For example, ETS allows other traffic classes to use the available bandwidth when the offered load in a traffic class does not use its full bandwidth. In this way, large packets and time consuming workloads (such as FCoCEE data backup to terabyte or larger databases) will not dominate the network at the expense of smaller packets (Ethernet LANs). However, if an application requires a large amount of dedicated bandwidth for a given interval (for example, due to a disaster recovery event) ETS does not permit bandwidth reservations across the network.

Consider a switch attached to two hosts A and B. The switch has two input port I1 and I2 and an output port O1. I1 and I2 are attached to hosts A and B respectively. Each link is rated 10 Gbps (with 8 Gbps throughput, for instance). Assume A and B transmit flows F1/F1', F2/F2' and F3/F3' assigned to three priority groups 5, 4 and 1 respectively sharing bandwidth as 50%, 40% and 10%. The switch steers flows from A and B through output port O1. F1, F2 and F3 from A will get 4 Gbps, 3.2 Gbps and 0.8 Gbps on the link to I1.

Similarly F1', F2' and F3' from B will get 4 Gbps, 3.2 Gbps and 0.8 Gbps to port I2. ETS will give F1/F1', F2/F2' and F3/F3' 2 Gbps, 1.6 Gbps and 0.4 Gbps each at output port 01 consistent with available physical link bandwidth. ETS divides bandwidth based on bandwidth shares requested for a given physical link. ETS does not provide a mechanism to schedule high bandwidth flows with absolutely specified bandwidths end to end for a specified duration.

In contrast, system 10 in a CEE/FCoE network 12 provides a method of enabling ETS to reserve bandwidth for a selected priority group by scheduling bandwidth reservation for a priority group by a host server 14 based on projected workload duration. Further, system 10 tags the priority group for which bandwidth is to be reserved with a virtual ID by the host server 14. In addition, system 10 recognizes the virtual ID by ETS whereby ETS schedules known traffic delivery and notifies all attached servers 20 in the network 12 that bandwidth reservation for a priority group having the virtual ID is reserved, and routs the priority group through the network avoiding bottlenecks.

Figure 8:
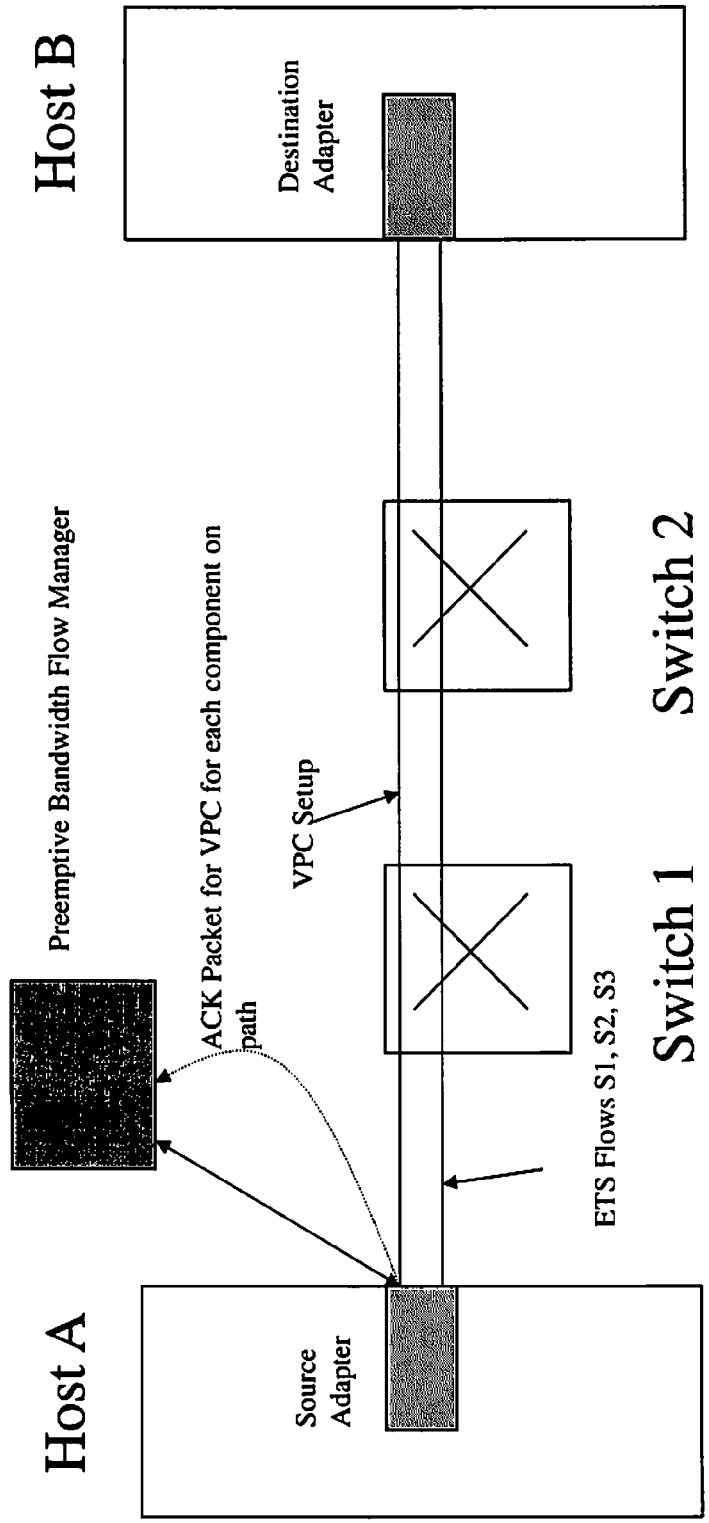
FIG. 8 illustrates phase I of preemptive bandwidth transfer in accordance with the invention.
Figure 9:
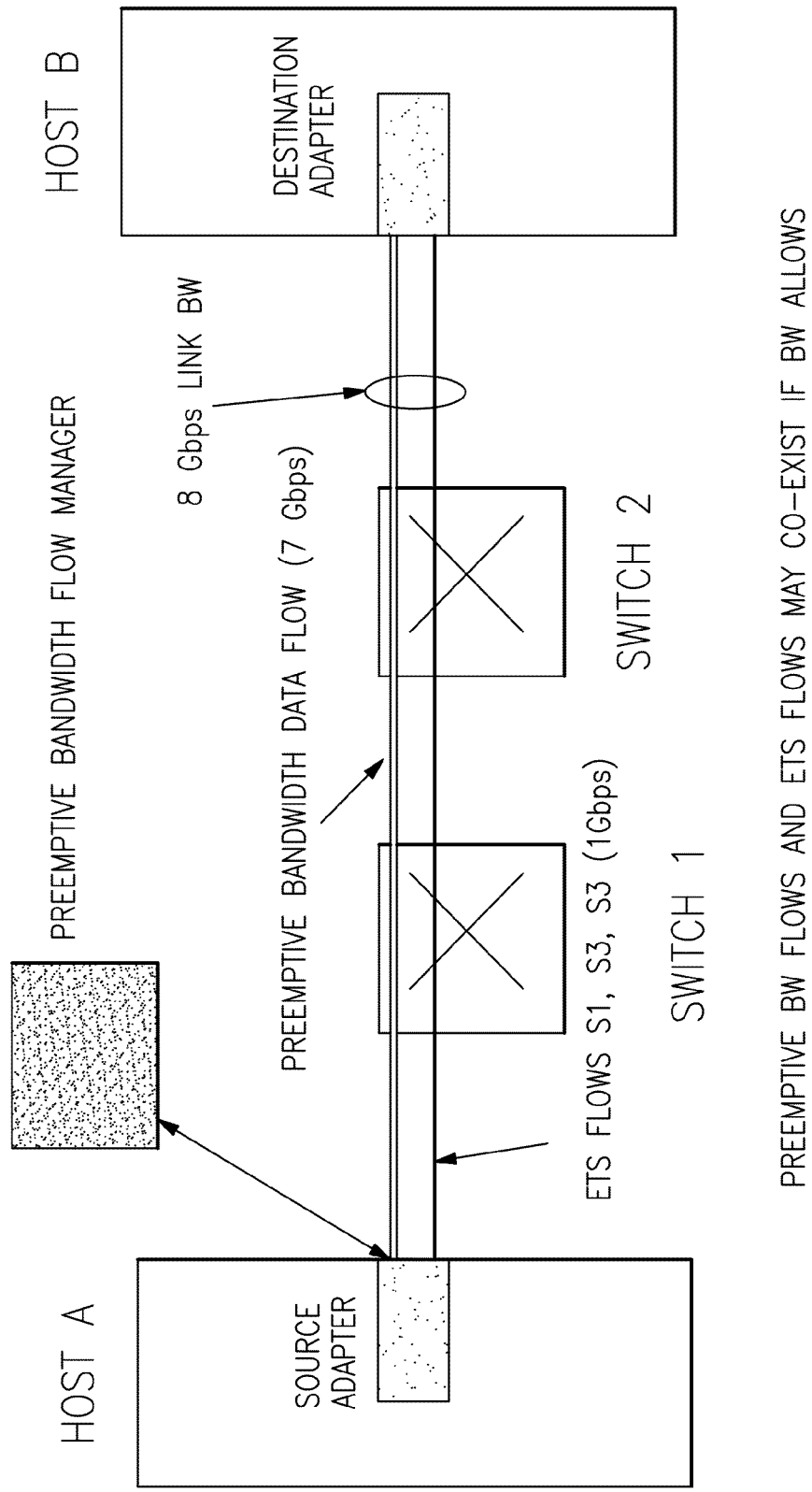
FIG. 9 illustrates phase II of preemptive bandwidth transfer in accordance with the invention.

For example, consider the network VLAN configuration in FIGS. 8 and 9. Host A transfers flows S1, S2 and S3 across two switches SW1 and SW2 to host B. S1, S2 and S3 share bandwidth as 50%, 30% and 20% made possible by ETS on the host A adapter and output ports of each switch. A VLAN Preemptive bandwidth manager (PBM) process can run in a virtual machine partition on a network management node or host A-B. The PBM accepts requests from hosts for transfer of sustained bandwidth flows. It synchronizes it's time to NTP (Network Time Protocol) as other hosts are synchronized to NTP also. The PBM maintains a table of flow names, flow route (as a linked list of host names and switch names), requested bandwidth, granted bandwidth, NTP start time and Requestor priority (user or admin).

A disaster recovery scenario (e.g.) could result in an administrative priority process requesting a bandwidth schedule that must preempt all flows in progress. A PBM flow scheduler reads entries in the table and schedules a flow with the earliest deadline and highest priority. It sends a virtual preemptive connection (VPC) setup packet (with suitable PB (Preemptive Bandwidth) ID) along the requested route (A, SW1, SW2 and B). It receives ACK packets from each of A, SW1, SW2 and B. Assume that the preemptive flow requiring transfer is 7 Gbps out of a possible 8 Gbps on each link. Assume S1, S2, S3 and the preemptive bandwidth flow all share the same output ports on SW1 and SW2.

Host A uses PBID to transfer data to switch SW1. At the output port of SW1, ETS will make 1 Gbps available to S1, S2, and S3 while 7 Gbps will be used for the preemptive bandwidth flow. All packets with the PBID corresponding to the preemptive bandwidth flow will be given the required bandwidth. This action repeats at switch SW2 and at the network adapter on host B.

ETS can use highest priority groups for certain IPC (inter-processor communication) traffic that require lowest latency but without any specific bandwidth allocation requirement. If such flows are in progress across switches where a preemptive bandwidth flow must be scheduled then special treatment is required. A PFC (priority flow control) PAUSE message is sent on the virtual lane from any switches with highest priority traffic, to senders on other hosts. Other bandwidth share flows are paused using PAUSE frames. The high priority queue on the switch is drained, e.g. all packets with highest priority (with low-latency requirement and no bandwidth allocation requirement) are transmitted to the destination. If spare bandwidth is available during scheduling of the preemptive bandwidth flow then any high priority flows may be scheduled but the sender is informed of the reduced performance. Alternatively, a PAUSE frame mechanism may be used. All the above steps happen during virtual preemptive connection (VPC) setup phase defined above.

In one embodiment, system 10 enables ETS to reserve a shared bandwidth for a traffic flow group. In another embodiment, system 10 enables hard-reserving of bandwidth for a traffic flow group based on priority of the traffic flow group in a CEE network 12.

In one embodiment, system 10 hard-reserves bandwidth for a traffic flow group by utilizing a host server 14. In another embodiment, the host server 14 schedules bandwidth reservations for a traffic flow group based on workload projection and allocates a virtual ID to the traffic flow group. Based on the virtual ID, ETS identifies the schedule and reserves bandwidth to the traffic flow group.

It should be noted that in some alternative implementations, the functions noted in a flowchart block may occur out of the order noted in the figures. For instance, two blocks shown in succession may, in fact, be executed substantially concurrently, or the blocks may sometimes be executed in the reverse order, depending upon the functionality involved because the flow diagrams depicted herein are just examples. There may be many variations to these diagrams or the steps (or operations) described therein without departing from the spirit of the invention. For example, the steps may be performed concurrently and/or in a different order, or steps may be added, deleted, and/or modified. All of these variations are considered a part of the claimed invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system for enabling enhanced transmission selection (ETS) to reserve bandwidth for a selected priority group, the system comprising:
    a server including a computer processor in a Fibre Channel over Convergence Enhanced Ethernet (FCoCEE) network;

a reservation system in communication with the server that utilizes enhanced transmission selection (ETS) to reserve bandwidth for a priority group by scheduling bandwidth for the priority group based upon a projected workload; and a table of flow names, flow routes as a linked list of host names and switch names, requested bandwidths, granted bandwidths, Network Time Protocol start times and requestor priorities at the reservation system for scheduling bandwidth for the priority group based upon the projected workload duration.

2. The system of claim 1 wherein the server tags the priority group for which bandwidth is to be reserved with a virtual ID.

3. The system of claim 2 wherein the virtual ID is recognized by ETS, which schedules known traffic delivery and notifies other servers in the FCoCEE network that bandwidth for the priority group having the virtual ID is reserved.

4. The system of claim 1 wherein the server routes the priority group through the FCoCEE network avoiding bottlenecks.

5. The system of claim 1 wherein the reservation system uses ETS to reserve a shared bandwidth for the priority group.

6. The system of claim 1 wherein the projected workload is based upon duration of the projected workload.

7. The system of claim 1 wherein the reservation system uses ETS to reserve a sustained bandwidth end to end for the priority group.

8. The system of claim 1 wherein the reservation system requests a bandwidth schedule that preempts all flows in progress.

9. The system of claim 8 wherein the reservation system notifies senders of the flows in progress of reduced throughput.

10. A computer program product embodied in a non-transitory computer usable medium comprising:

computer readable program codes coupled to the non-transitory computer usable medium to enable enhanced transmission selection (ETS) to reserve bandwidth for a selected priority group, the computer readable program codes configured to cause the program to:

utilize enhanced transmission selection (ETS) through a reservation system in communication with a server including a computer processor in a Fibre Channel over Convergence Enhanced Ethernet (FCoCEE) network;

reserve bandwidth for a priority group by scheduling bandwidth for the priority group based upon a projected workload; and schedule bandwidth for the priority group based upon the projected workload duration by utilizing a table of flow names, flow routes as a linked list of host names and switch names, requested bandwidths, granted bandwidths, Network Time Protocol start times and requestor priorities.

11. The computer program product of claim 10 further comprising program code configured to: tag the priority group at the server for which bandwidth is to be reserved with a virtual ID, and the virtual ID is recognized by ETS, which schedules known traffic delivery and notifies other servers in the FCoCEE network that bandwidth for the priority group having the virtual ID is reserved.

12. The computer program product of claim 10 further comprising program code configured to: route via the server the priority group through the FCoCEE network to avoid bottlenecks, and the reservation system uses ETS to reserve a shared bandwidth for the priority group.

13. The computer program product of claim 10 further comprising program code configured to: base the projected workload upon duration of the projected workload, and using ETS to reserve a sustained bandwidth end to end for the priority group.

14. The computer program product of claim 10 further comprising program code configured to: request through the reservation system a bandwidth schedule that preempts all flows in progress.

15. The computer program product of claim 10 further comprising program code configured to: notify senders of the flows in progress of reduced throughput by the reservation system.

* * * * *